US008080952B2

(12) United States Patent
Lotfi et al.

(10) Patent No.: US 8,080,952 B2
(45) Date of Patent: Dec. 20, 2011

(54) HANDS FREE WASTE FLAP APPARATUS AND METHOD

(75) Inventors: Abbas Lotfi, Corona, CA (US); Michael Lehmann, Fullerton, CA (US)

(73) Assignee: Adams Rite Aerospace, Inc., Fullerton, CA (US)

( * ) Notice: Subject to any disclaimer, the term of this patent is extended or adjusted under 35 U.S.C. 154(b) by 43 days.

(21) Appl. No.: 12/305,170

(22) PCT Filed: Jun. 18, 2007
(Under 37 CFR 1.47)

(86) PCT No.: PCT/US2007/014142
§ 371 (c)(1),
(2), (4) Date: Oct. 8, 2009

(87) PCT Pub. No.: WO2007/149360
PCT Pub. Date: Dec. 27, 2007

(65) Prior Publication Data

US 2010/0051619 A1 Mar. 4, 2010

Related U.S. Application Data

(60) Provisional application No. 60/814,069, filed on Jun. 16, 2006.

(51) Int. Cl.
*H02P 1/00* (2006.01)
*H02P 3/00* (2006.01)
*H02P 5/00* (2006.01)

(52) U.S. Cl. ........ 318/266; 318/280; 318/445; 220/211; 220/260

(58) Field of Classification Search .................. 318/266, 318/445, 280; 220/211, 260
See application file for complete search history.

(56) References Cited

U.S. PATENT DOCUMENTS

| | | | | |
|---|---|---|---|---|
| 5,329,212 | A | 7/1994 | Feigleson | |
| 5,770,935 | A * | 6/1998 | Smith et al. | 318/480 |
| 6,859,005 | B2 * | 2/2005 | Boliver | 318/480 |

* cited by examiner

*Primary Examiner* — Walter Benson
*Assistant Examiner* — Erick Glass
(74) *Attorney, Agent, or Firm* — Baker & Hostetler LLP

(57) ABSTRACT

A method and apparatus for an automated waste receptacle includes a waste flap, a motor positioned on a side of the waste flap and an actuator located in proximity of the top side of the waste flap. The actuator is configured to operate the motor and subsequently move the flap between open and closed positions.

7 Claims, 3 Drawing Sheets

HANDS FREE WASTE FLAP APPARATUS AND METHOD

FIELD OF THE INVENTION

The present invention relates generally to promoting and reducing the spread of bacteria in high traffic areas. More particularly, the present invention relates to an automatic waste container lid.

SUMMARY OF THE INVENTION

The foregoing needs are met, to a great extent, by the present invention, wherein in one aspect an apparatus is provided the automatic operation of a waste flap for waste disposal.

In accordance with an embodiment of the present invention, an automated waste receptacle includes a waste flap hingedly attached to an adjoining surface, a motor positioned on a bottom side of the waste flap, an anchor point positioned on the adjoining surface and linked to the motor via a cable, and an actuator, located in proximity of a top side of the waste flap, to operate the motor and subsequently move the waste flap between open and closed positions.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
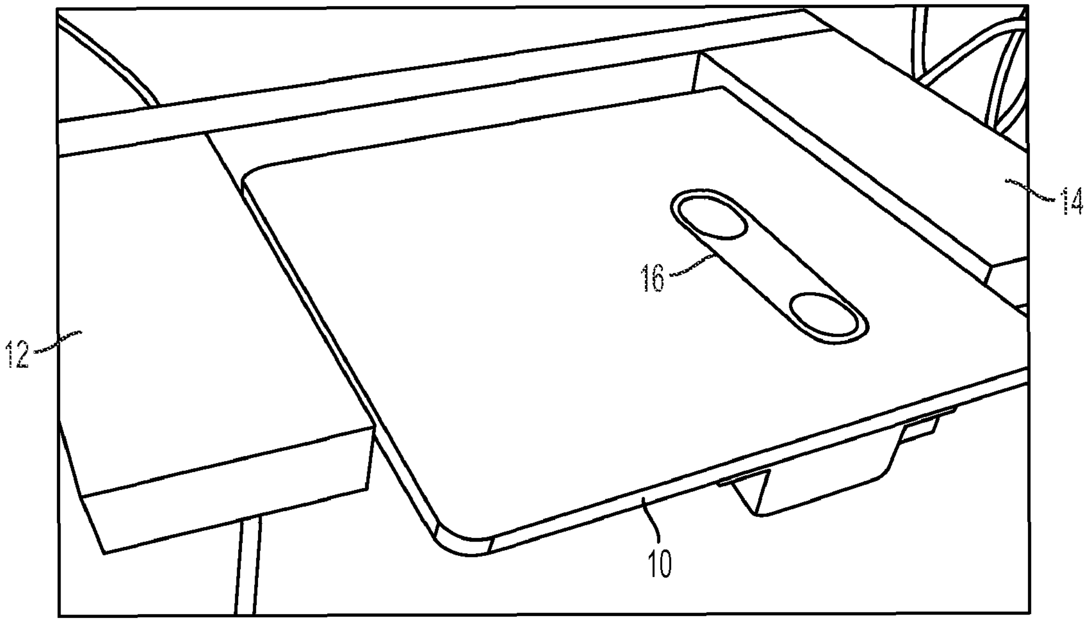
FIG. 1 is a perspective view of the invention according to a preferred embodiment.

The invention will now be described with reference to the drawing figures, in which like reference numerals refer to like parts throughout. An embodiment in accordance with the present invention provides an automated waste flap that detects when the flap needs to be opened in order to deposit material therein.

An embodiment of the present inventive apparatus and method is illustrated in FIG. 1. The waste flap 10 is positioned over an opening such that it permits material to deposited therein and is attached to the adjoining surface 14 by hinge 21 (not shown for clarity). As can be seen from the figures, the waste flap 10, when in the closed position, is flush with the adjoining surfaces 12, 14. Located on top of the waste flap are actuators 16, which sense or determine that the flap needs to be moved to either the closed or open position. In one embodiment, electronics on the motor drive include a proximity detection circuit that activates the motor drive when the presence or motion is detected. In another embodiment, actuator 16 includes an infrared detector.

The above preferred embodiment can be installed in any number of areas within a house or dwelling or even a transportation vehicle such as an airplane, train, ship or bus. This preferred embodiment is ideal for areas in which there is high volume of individuals using the facilities.

Figure 2:
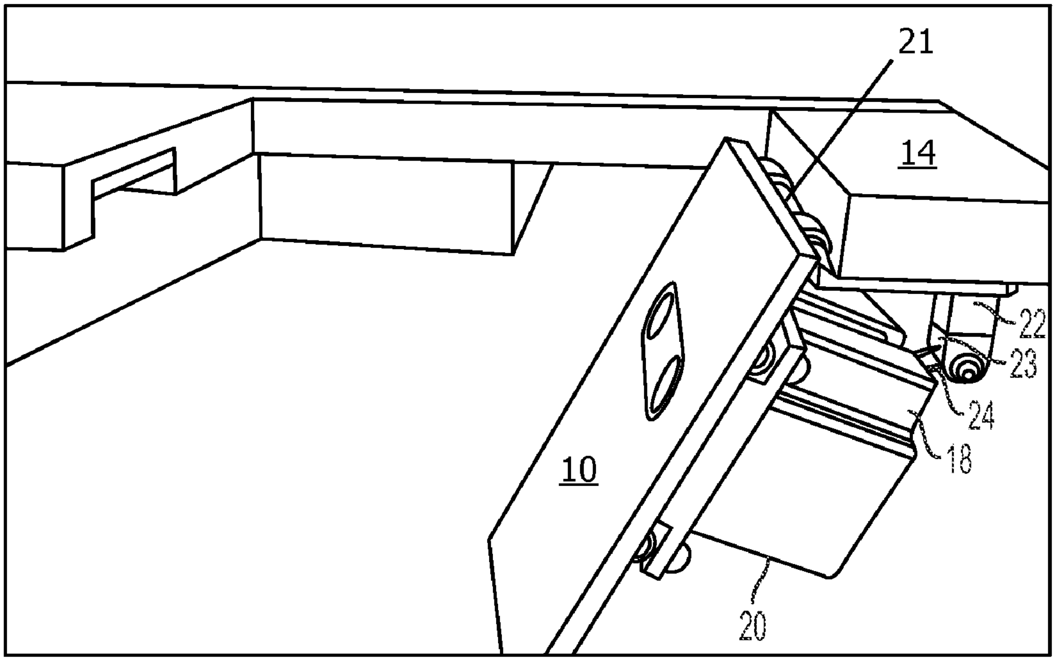
FIG. 2 is a view of the waste receptacle in the open position according to the preferred embodiment.

FIG. 2 illustrates the waste flap 10 in the open position therefore allowing material to pass through the opening. This figure illustrates a motor 18 encased in a housing 20 and linked to an anchor or fixed point 22, which includes a pulley 23, via a cable 24. The waste flap 10 is attached to the adjoining surface 14 by hinge 21.

Figure 3:
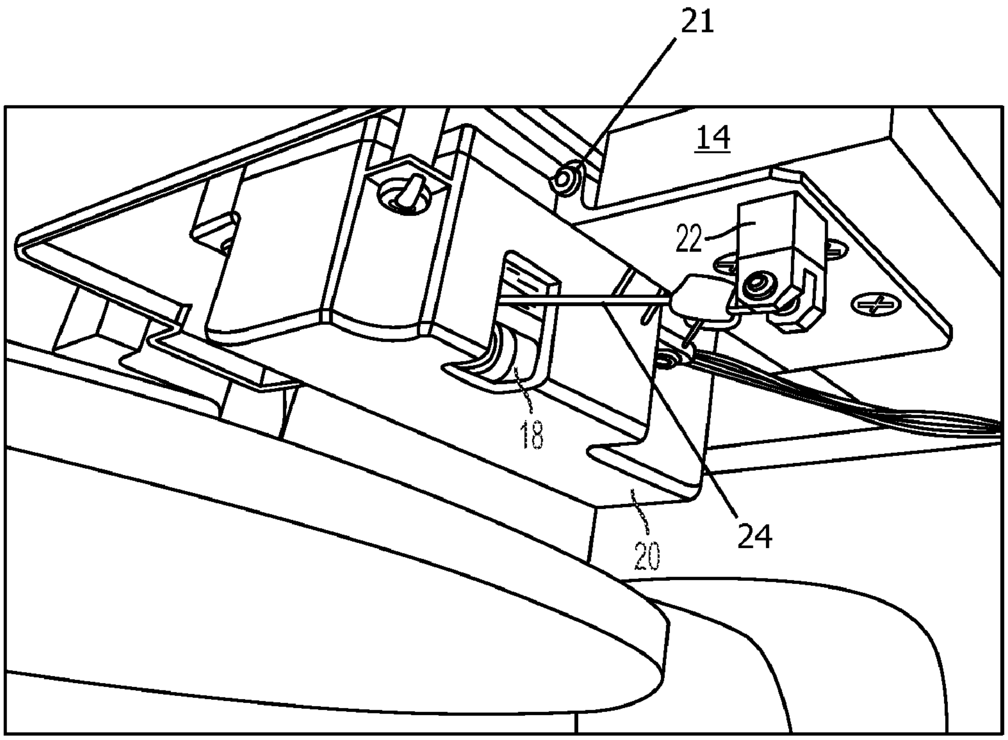
FIG. 3 is a view of the apparatus from the bottom of the waste receptacle flap according the preferred embodiment.

FIG. 3 illustrates the bottom side 26 of the waste flap 10. The waste flap 10 is attached to the adjoining surface 14 by hinge 21. Located on the bottom side is a housing 20 that contains at least motor 18 thereon. The motor 18 is linked to the anchor point 22 via a linkage such as a cable 24. As the motor 18 is activated and the flap is in the closed position, the motor 18 decreases the amount of linkage extending between the motor 18 and the anchor point 22. This serves to pull the flap into the open position by moving or urging it towards the anchor point 22.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An automated waste receptacle, comprising:

a waste flap hingedly attached to an adjoining surface;

a motor positioned on a bottom side of the waste flap;

an anchor point positioned on the adjoining surface and linked to the motor via a cable; and an actuator, located in proximity of a top side of the waste flap, to operate the motor and subsequently move the waste flap between open and closed positions.

2. The automated waste receptacle as in claim 1, wherein the motor is configured to wind the cable and subsequently pull the waste flap towards the anchor point.

3. The automated waste receptacle as in claim 1, wherein the actuator includes an infrared detector.

4. The automated waste receptacle as in claim 3, wherein the actuator is located on the top side of the waste flap.

5. The automated waste receptacle as in claim 3, wherein the actuator is located in close proximity to the top side of the waste flap.

6. The automated waste receptacle as in claim 1, further comprising a housing encasing the motor.

7. The automated waste receptacle as in claim 1, wherein the waste flap is flush with the adjoining surface when in the closed position.

* * * * *